(12) United States Patent
Saito et al.

(10) Patent No.: US 7,088,952 B1
(45) Date of Patent: Aug. 8, 2006

(54) APPARATUS FOR TRANSMITTING PROGRAM INFORMATION, COMMUNICATING SYSTEM, METHOD OF TRANSMITTING PROGRAM INFORMATION, METHOD OF INSTRUCTING PROGRAM RECORDING OPERATION, AND METHOD OF INSTRUCTING PROGRAM PURCHASING OPERATION

(75) Inventors: Hiroji Saito, Tokyo (JP); Tatsuji Nagaoka, Sapporo (JP); Tomoko Matsuura, Tokyo (JP); Mariko Wakaizumi, Tokyo (JP)

(73) Assignees: NTT Advanced Technology Corporation, Tokyo (JP); NTT DoCoMo, Inc., Tokyo (JP)

( * ) Notice: Subject to any disclaimer, the term of this patent is extended or adjusted under 35 U.S.C. 154(b) by 554 days.

(21) Appl. No.: 09/830,750

(22) PCT Filed: Sep. 1, 2000

(86) PCT No.: PCT/JP00/05957

§ 371 (c)(1),
(2), (4) Date: Apr. 30, 2001

(87) PCT Pub. No.: WO01/19002

PCT Pub. Date: Mar. 15, 2001

(30) Foreign Application Priority Data

Sep. 3, 1999 (JP) .................................. 11-250438

(51) Int. Cl.
*H04N 7/16* (2006.01)

(52) U.S. Cl. ............... 455/3.06; 455/3.04; 455/3.01; 455/3.05; 455/3.03; 725/46; 725/91; 386/83

(58) Field of Classification Search ............ 455/3.01, 455/3.03, 3.05, 3.06, 3.04; 725/46, 91; 386/83
See application file for complete search history.

(56) References Cited

U.S. PATENT DOCUMENTS

| 5,223,924 A | 6/1993 | Strubbe |
| 5,416,508 A | 5/1995 | Sakuma et al. |
| 5,819,103 A | 10/1998 | Endoh et al. |

(Continued)

FOREIGN PATENT DOCUMENTS

| CA | 2267895 |   | 4/1998 |
| CN | 1216428 A |   | 5/1999 |
| EP | 0838951 | * | 4/1998 |

(Continued)

OTHER PUBLICATIONS

"Successful Mobile Information Devices. Recent Increases in the Use of Mail", *Nikkei Electronics*, vol. 737, Feb. 22, 1999, pp. 160–163.

(Continued)

*Primary Examiner*—Nick Corsaro
*Assistant Examiner*—Alan T. Gantt
(74) *Attorney, Agent, or Firm*—Brinks Hofer Gilson & Lione

(57) ABSTRACT

Program guide information of the program to be broadcast by the broadcast station 1 is reserved in the EPG server 15 of the center station 11. The EPG server 15 retrieves for each user, the program satisfying the conditions such as the category of the program registered in the personal information database 16, and then transmits the guide information of the retrieved programs to the portable telephone 14 of a user who has set the conditions, via the communication network 10. Thereby, even if the user is outside the home, if there is a program satisfying the conditions specified by the user, the user can obtain the information concerning the program by utilizing the portable telephone 14. Then, the user can instruct, with reference to the obtained program information, a recording operation from the portable telephone 14 to the VTR 6 in the home 12.

32 Claims, 13 Drawing Sheets

U.S. PATENT DOCUMENTS

| | | |
|---|---|---|
| 6,347,400 B1 | 2/2002 | Ohkura et al. |
| 6,721,954 B1 * | 4/2004 | Nickum .................. 725/46 |
| 2003/0118323 A1 * | 6/2003 | Ismail et al. .............. 386/83 |
| 2003/0154486 A1 * | 8/2003 | Dunn et al. ............... 725/91 |

FOREIGN PATENT DOCUMENTS

| | | |
|---|---|---|
| EP | 0 838 951 A2 | 4/1998 |
| EP | 858223 A2 | 8/1998 |
| EP | 0 892 554 A2 | 1/1999 |
| JP | H05-115063 | 5/1993 |
| JP | 7-168855 | 4/1995 |
| JP | H08-149447 | 6/1996 |
| JP | H09-051314 | 2/1997 |
| JP | H09-051520 | 2/1997 |
| JP | H09-102827 | 4/1997 |
| JP | H09-205636 | 8/1997 |
| JP | H10-028262 | 1/1998 |
| JP | H10-56600 * | 2/1998 |
| JP | H10-117337 | 5/1998 |
| JP | H10-126759 | 5/1998 |
| JP | H10-177777 | 6/1998 |
| JP | H10-200865 | 7/1998 |
| JP | H10-276161 | 10/1998 |
| JP | H11-55201 | 2/1999 |

OTHER PUBLICATIONS

Tera T., "A Personal Computer as a VCR. Easy–To–Use, Ultimate Video Recorder Personal Computers, Sony Vajo PCV–R Series Has Arrived", *ASCII*, vol.23, No. 7, Jul. 1, 1999, pp. 342–351.

Houda, H., "Connecting a Home Electrical Appliance to a Personal Computer. Section 3 Service Trend. An Electric Power Meter Becomes A Gateway", *Nikkei Electronics*, vol.743, May 17, 1995, pp. 121–126.

* cited by examiner

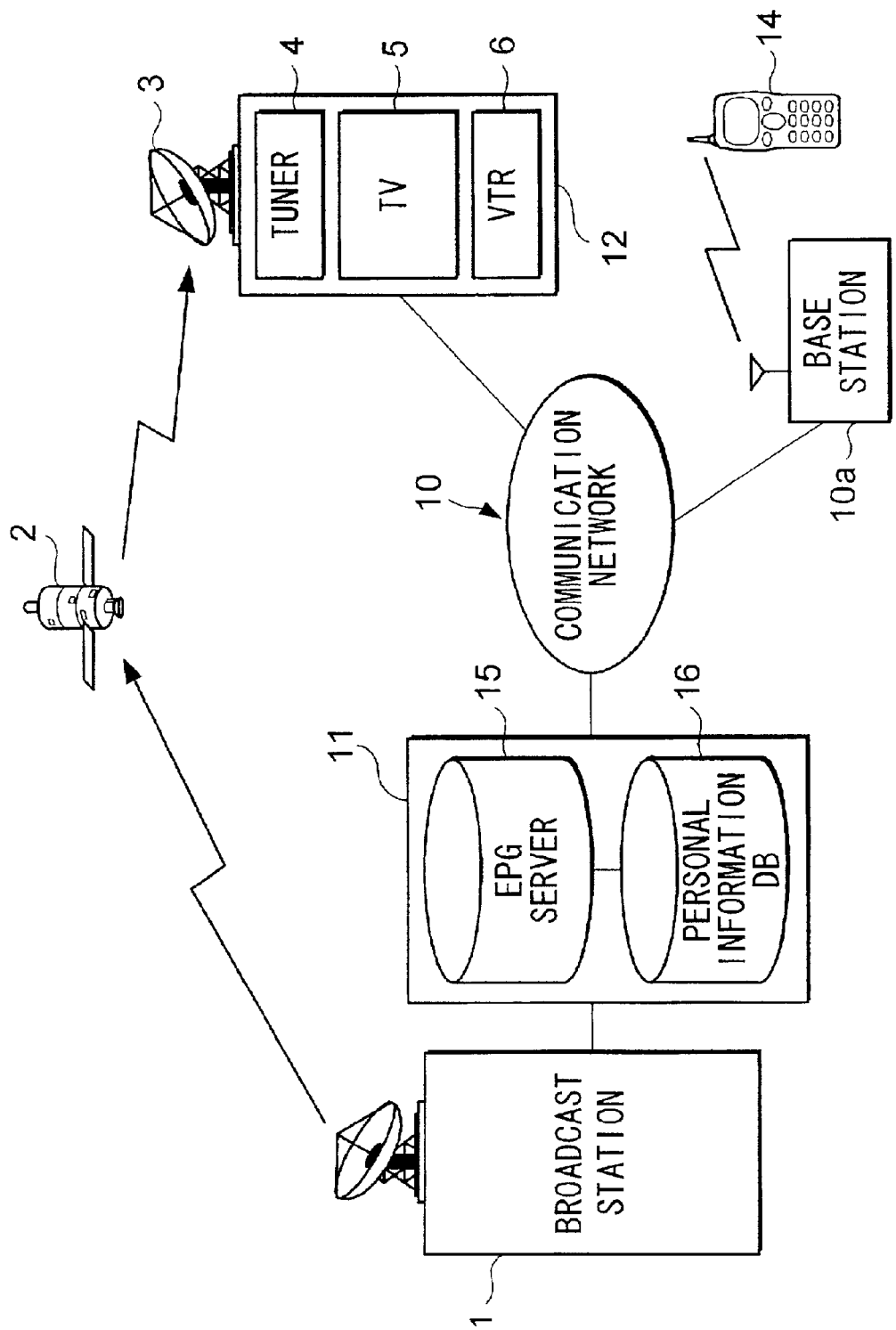

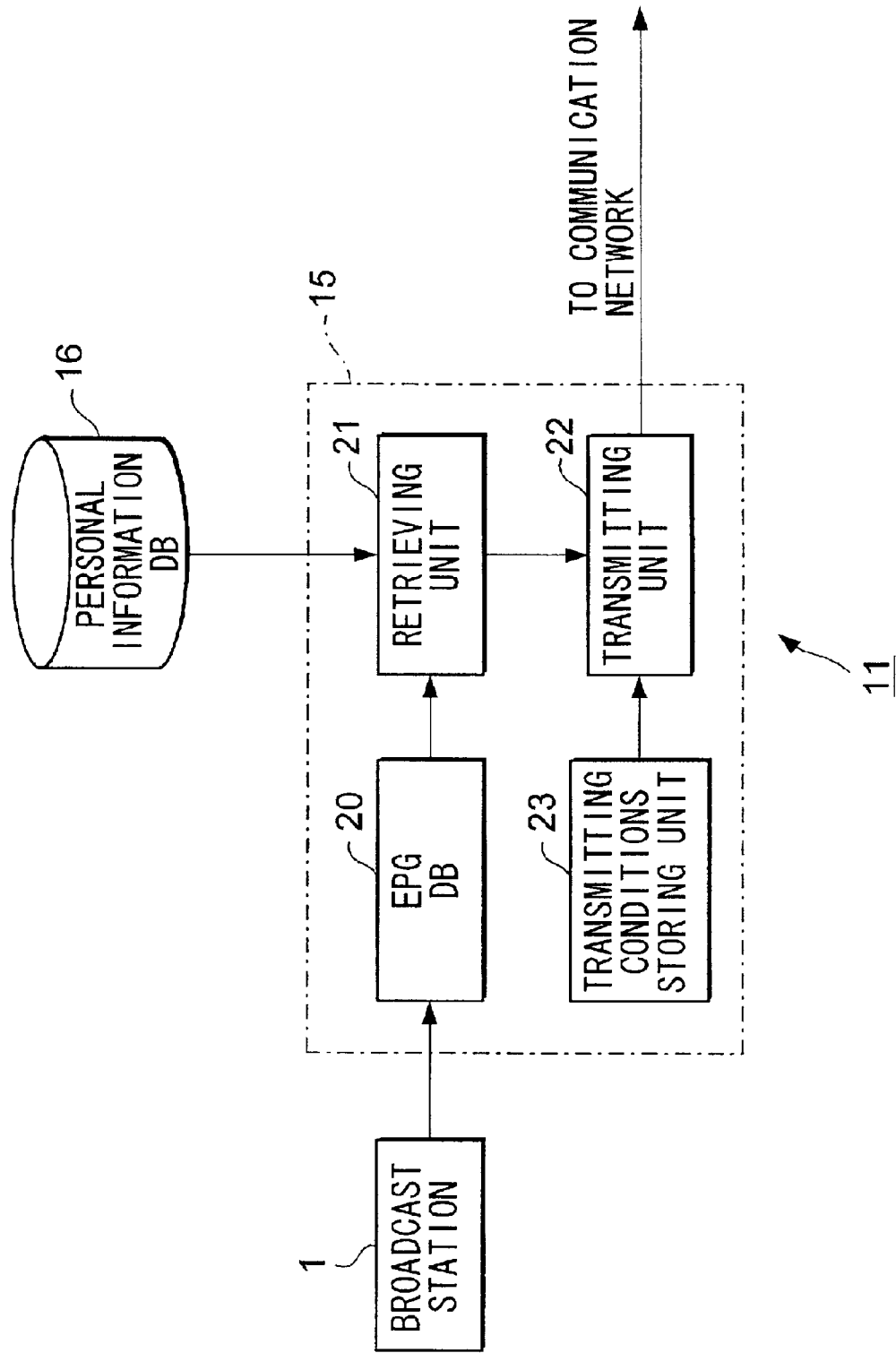

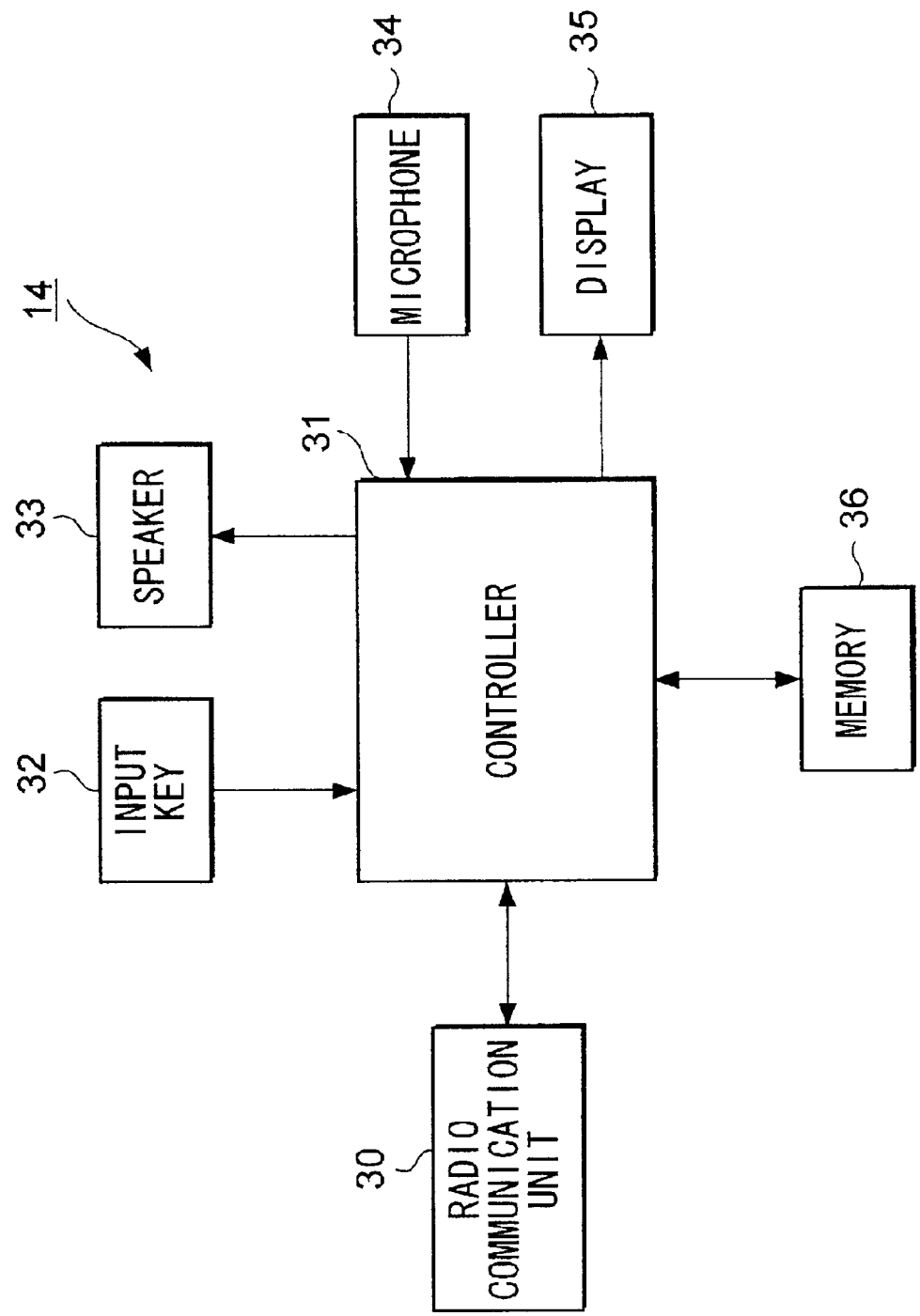

FIG. 11A
PROGRAM INFORMATION
IS RECEIVED.
DISPLAY ?
[ YES ]     NO
~ 35
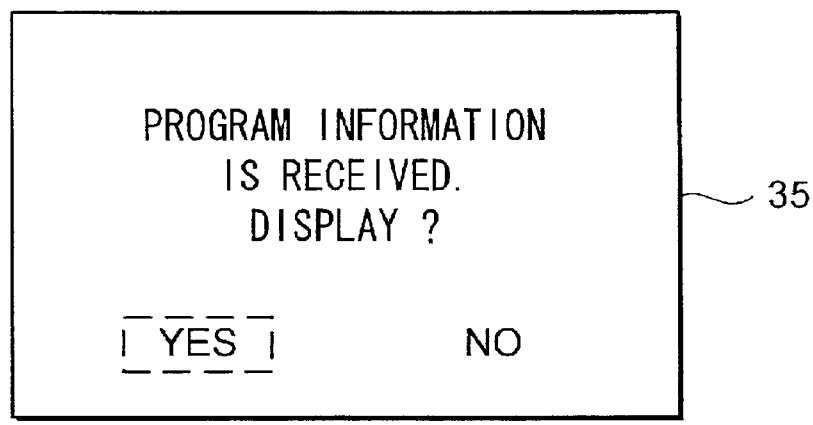
FIG. 11B
DATE ×/×   19:00~19:30
×ch   NEWS AT SEVEN O'-CLOCK
OBTAIN DETAILED INFORMATION ?
[ YES ]     INSTRUCTION OF
            RECORDING
            OPERATION
THE NUMBER OF PROGRAMS   5
~ 35
FIG. 11C
DATE ×/×   19:00~19:30
×ch   NEWS AT SEVEN O'-CLOCK
SUMMARY OF PROGRAM · · · · ·
CAST   TARO SUZUKI etc.
[ INSTRUCTION OF
  RECORDING      ]     RETURN
  OPERATION
~ 35
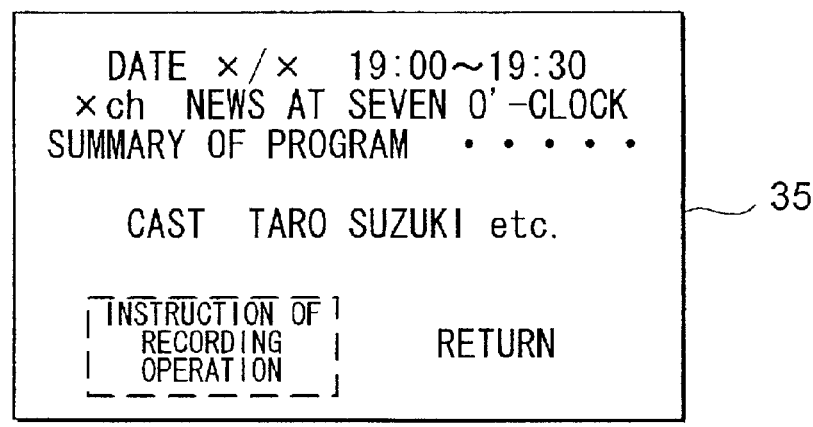

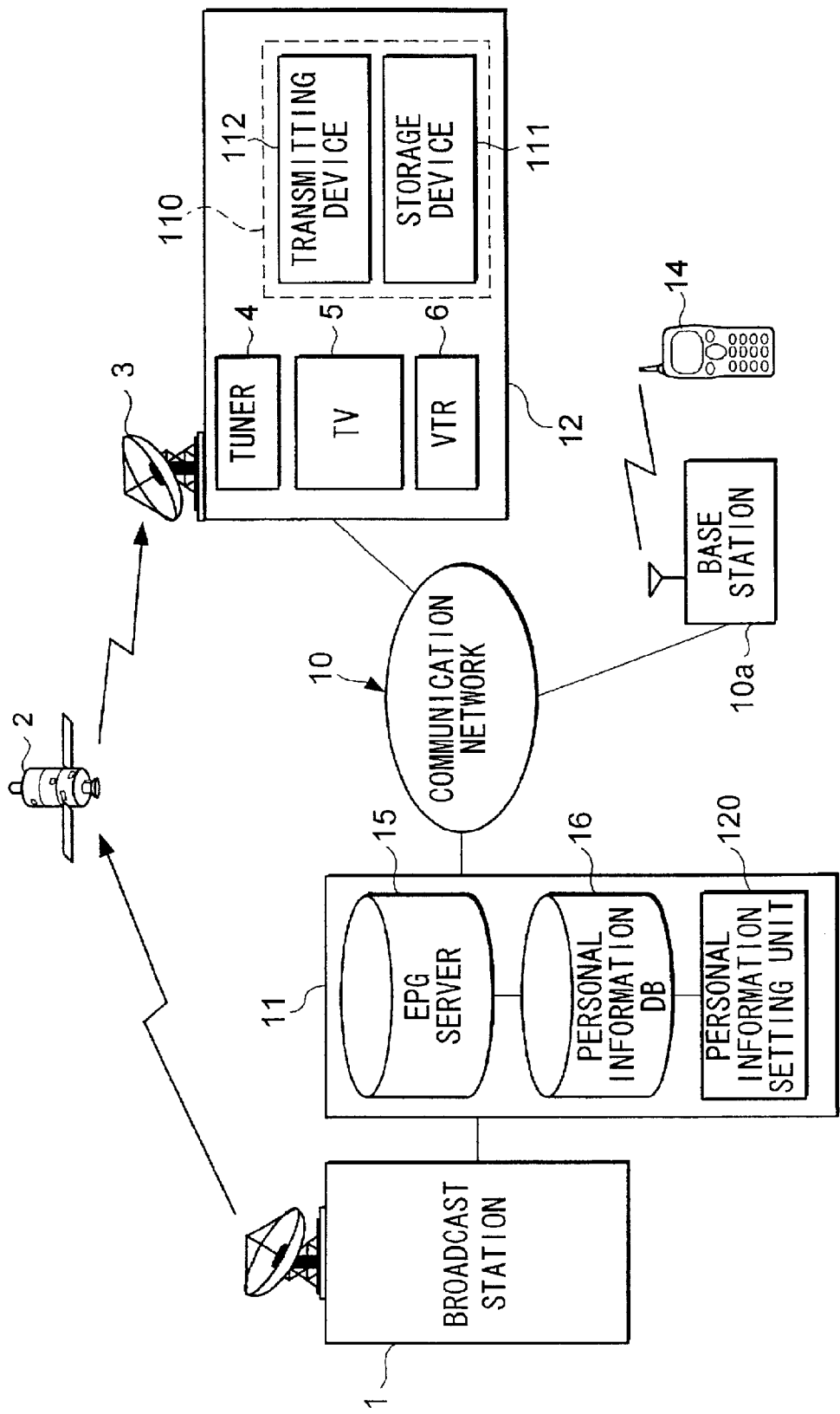

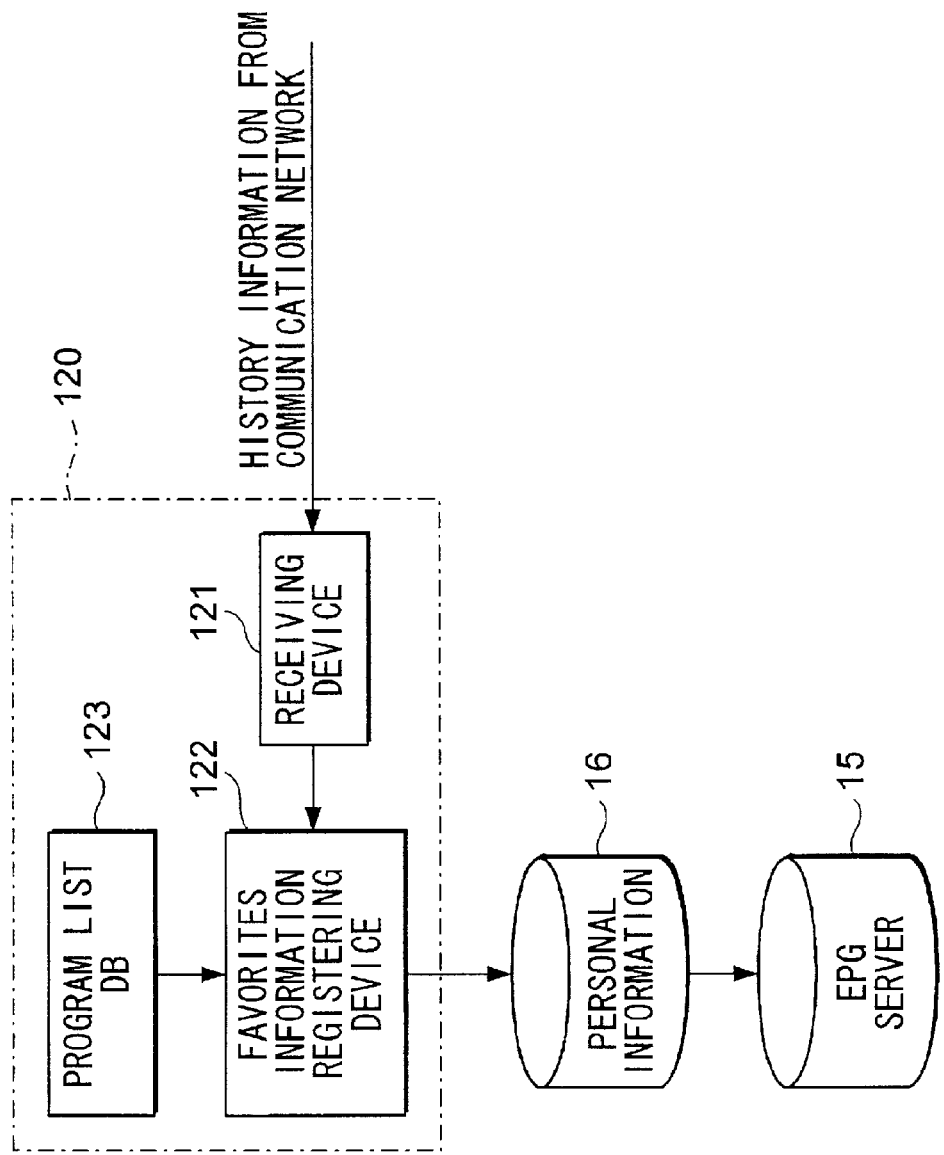

APPARATUS FOR TRANSMITTING PROGRAM INFORMATION, COMMUNICATING SYSTEM, METHOD OF TRANSMITTING PROGRAM INFORMATION, METHOD OF INSTRUCTING PROGRAM RECORDING OPERATION, AND METHOD OF INSTRUCTING PROGRAM PURCHASING OPERATION

TECHNICAL FIELD

The present invention relates to an apparatus and a method for transmitting program information concerning the program to be broadcast, to a radio communication terminal; a communicating system with said apparatus for transmitting program information; a method of instructing a program recording operation; and a method of instructing a program purchasing operation.

BACKGROUND ART

In recent years, a remote controlling system has been developed, the system instructing such a recording operation from outside the home to a VTR (video tape recorder) or the like in the home via telephone lines, etc.

By the way, as described above, when an operation of recording the desired programs is instructed from outside the home by remotely controlling the VTR, it is necessary for a user to memorize a channel and broadcast time of the program which he wants to record. However, in recent times, the number of the programs to be broadcast has been increasing as the TV broadcasting become multi-channeled, and therefore it is difficult for the user to memorize these broadcast times, channels, etc.

In consequence, an idea would come up that the data such as a program list is received outside the home, so as to instruct the recording operation with reference to the received program list. However, in the case where data of the program list above described is received by a portable terminal and the like, if the number of the programs contained in the program list data is many, it is considered that the data amount thereof will be large, and therefore the memory of the portable terminal with a limited volume will be subjected to pressure. Also, since the display screen loaded on the portable terminal is small, the operation of finding the desired programs among the many programs displayed on the screen becomes troublesome.

The present invention has been made in consideration of the above circumstances, and the object of it is to provide a program information transmitting method and an apparatus capable of providing information concerning the necessary program for the user away from the home; a communicating system allowing the user outside the home to obtain the necessary information for him and to precisely instruct the recording operation or the purchasing operation of the desired programs from outside the home; a method of instructing a program recording operation;.and a method of instructing a program purchasing operation.

DISCLOSURE OF INVENTION

In accordance with the present invention, there is provided an apparatus for wirelessly transmitting program information concerning a program to be broadcast, to a radio communication terminal, comprising: a program information database in which program information concerning a program to be broadcast is reserved; retrieving-conditions-storing-means for storing retrieving conditions which are set corresponding to a radio communication terminal; retrieving means for retrieving a program satisfying the retrieving conditions stored in said retrieving-conditions-storing-means from said program information database; and transmitting means for voluntarily transmitting, when a program satisfying said retrieving conditions is retrieved by means of said retrieving means, the program information concerning said retrieved program to said radio communication terminal corresponding to said retrieving conditions.

According to an another aspect of the present invention, there is provided a communicating system, comprising a radio communication terminal for performing a radio communication; a program-information-transmitting-apparatus for transmitting information concerning a program to be broadcast to said radio communication terminal; a program recording apparatus for recording a program to be broadcast; and a communication network connecting the apparatuses with one another, wherein said program-information-transmitting apparatus has a program information database in which program information concerning a program to be broadcast is reserved; retrieving-conditions-storing-means for storing retrieving conditions which are set corresponding to said radio communication terminal; retrieving means for retrieving a program satisfying the retrieving conditions stored in said retrieving-conditions-storing-means from said program information database; and transmitting means for voluntarily transmitting, when a program satisfying said retrieving conditions is retrieved by means of said retrieving means, a program information concerning the retrieved program to said radio communication terminal corresponding to said retrieving conditions; said radio communication terminal has program-information-storing-means for storing a program information transmitted from said program-information-transmitting-apparatus; displaying means for displaying a program information stored in said program-information-storing-means; and recording-instruction-transmitting-means for transmitting recording-instruction-information instructing a program recording operation to said program recording apparatus via said communication network; and said program recording apparatus has instruction-information-receiving-means for receiving said recording-instruction-information transmitted via said communication network and recording-operation-executing-means for recording a program to be broadcast in accordance with the recording-instruction-information received by said instruction-information-receiving-means.

According to an another aspect of the present invention, there is provided a method of wirelessly transmitting a program information concerning a program to be broadcast to a radio communication terminal, said method comprising the steps of: a retrieving step of retrieving a program satisfying retrieving conditions which are set corresponding to the radio communication terminal, from a program information database in which program information concerning a program to be broadcast is reserved; and a transmitting step of, when a program satisfying said retrieving conditions is retrieved in said retrieving step, voluntarily transmitting a program information concerning the retrieved program to said radio communication terminal corresponding to said retrieving conditions.

According to an another aspect of the present invention, there is provided a program-recording-instruction-method of instructing a recording operation of a program from a radio communication terminal to a program-recording-apparatus for recording a program to be broadcast, comprising the steps of: a program-retrieving-step of retrieving a program which satisfies retrieving conditions preset by a user of said radio communication terminal, from a database in which program information concerning a program to be broadcast is reserved; a program-information-transmitting-step, in which, when a program satisfying said retrieving conditions is retrieved, a program information concerning the retrieved program is obtained from said database, so that the program information is voluntarily transmitted to said radio communication terminal; a program-information-displaying-step of receiving the transmitted program information at said radio terminal and displaying the received program information, so as to prompt the user to instruct the recording operation of the program; and a recording-instruction-transmitting-step, in which, when the recording operation of the program is instructed, recording-instruction-information is transmitted from said radio communication terminal to said program-recording-apparatus.

According to an another aspect of the present invention, there is provided a program-recording-instruction-method of instructing a purchasing operation of a program from a radio communication terminal to a program-providing-apparatus, said program-providing-apparatus providing a registered user with a program instructed from the user to purchase it, comprising the steps of: a program-retrieving-step of retrieving a program satisfying-the retrieving conditions which are set corresponding to a user of said radio communication terminal from a database in which program information concerning a program to be broadcast is reserved; a program-information-transmitting-step, in which, when a program satisfying said retrieving conditions is retrieved, a program information concerning the retrieved program is obtained from said database, so that the program information is voluntarily transmitted to said radio communication terminal; a program-information-displaying-step of receiving the transmitted program information at said radio terminal and displaying the received program information, so as to prompt the user to instruct the purchasing operation of the program; and a purchasing-instruction-transmitting-step, in which, when the purchasing operation of the program is instructed, the purchasing-instruction-information is transmitted from said radio communication terminal to said program-providing-apparatus.

BRIEF DESCRIPTION OF DRAWINGS

FIG. 1 is a diagram showing configurations of a communicating system and a broadcasting system to which a program-information-providing-service being provided by the communicating system, in accordance with one embodiment of the present invention.

FIG. 2 is a block diagram showing a functional configuration of a center station which is an element of said communicating system.

FIG. 3 is a block diagram showing a configuration of a portable telephone which is an element of said communicating system.

FIGS. 11A–11C are diagrams illustrating the contents displayed on the display of the portable telephone, which is an element of another modified embodiment of said communication system.

FIG. 12 is a diagram showing a further modified embodiment of said communicating system.

FIG. 13 is a block diagram showing a functional configuration of the center station, which is an element of the further modified embodiment.

BEST EMBODIMENT FOR CARRYING OUT THE INVENTION

Figure 4A:
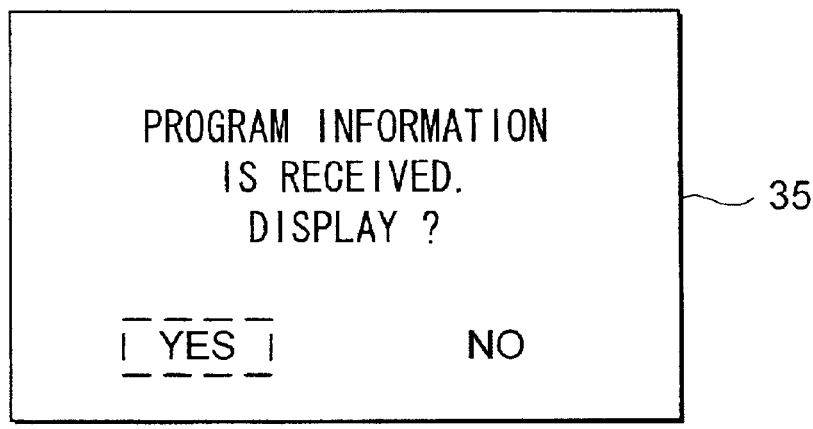
FIGS. 4A–4C are diagrams illustrating an example of the contents displayed on the display of said portable telephone upon receiving a program guide and displaying it.

In the following, description will be given on embodiments of the present invention referring to the attached drawings.

A. Configuration of the Embodiments

A-1. Overall Configuration of a Broadcasting System

First, FIG. 1 shows an overall configuration of a communicating system and a broadcasting system by which the program information broadcast by the communicating system being provided to the user, in accordance with one embodiment of the present invention. As shown in this figure, in the broadcasting system, a broadcast radio wave from a broadcast station 1 is received by a satellite 2, in which a predetermined signal process is made to the received radio wave, and the processed radio wave is irradiated to the ground. In each home 12, the radio wave irradiated from the satellite 2 is received by an antenna 3, so as to tune and demodulate by a tuner 4. In this way, the program broadcast by the broadcast station 1 is projected onto the television 5 in the home 12.

In addition, as described above, the VTR (program recording device) 6 provided in the home can record the program that can be watched by the television 5 in the home. The VTR 6 has a record reservation function, by which a recording operation can be executed based on the time and channel set by the user. The details of the VTR 6 will be described later.

A-2. Overall Configuration of the Communication System

Next, the numeral 10 represents a communication network comprising a fixed telephone network, a mobile communication network and the like, and a center station (program-information-transmitting-apparatus) 11 and the home 12 being connected together via the communication network 10. Further, the communication network 10 has a plurality of base stations 10a (only one of them is shown), and the telecommunications equipment connected to the communication network 10 is capable of communicating between it and a portable telephone (radio communication terminal) 14 positioned in a predetermined service area. Although it is possible to connect the communication network 10 with a number of telephones in the home and a number of the portable telephones, for the simplification of explanation,, only one home 12 and one portable telephone 14 are shown in the figure.

A-3. Configuration of the Center Station

The center station 11 serves to distribute program information so that an electronic program guide (referred to as "EPG" thereinafter) data is transmitted to the portable telephone 14 which is to be connected to the communication network 10, the center station 11 comprising an EPG server 15 for controlling the transmission of the EPG data and a personal information database (retrieving-conditions-storing-means) 16 for storing information, the information being set for each user who utilizes the program information distribution service provided by the center station 11. The EPG is information concerning the programs to be broadcast by the broadcast station 1, the EPG including information such as broadcast date-and-time of each program, channel, cast, category of the program, summary of the program, and G code used for recording the program, concretely.

FIG. 2 is a block diagram showing a functional configuration of the EPG server 15. As shown in the figure, the EPG server 15 comprises an EPG database 20, a retrieving unit 21, a transmitting unit 22, and a transmission-conditions-storing-unit 23.

The EPG database 20 is a database which reserves the EPG data of the program to be broadcast by the broadcast station 1. The EPG database 20 is sequentially updated in response to the program information which is provided from the broadcast station 1 at every predetermined time interval. The EPG data to be reserved in the EPG database 20 may be sent to and written into the EPG database 20 after being produced on the broadcast station 1 side, or may be written into the EPG database 20 after being produced for the use of transmission to the portable telephone in response to the information provided from the broadcast station 1. In the present embodiment, it is assumed that the EPG data to be transmitted to the portable telephone is produced so that an indication as will hereinafter be described can be provided on the display of the portable telephone 14.

The retrieving unit 21 retrieves EPG data which conforms to the personal information which is set in the personal information database 16, from the EPG data of a number of programs reserved in the EPG database 20. In the personal information database 16, information on favorites (favorites information) for individuals is set corresponding to (the user of) each portable telephone registered with a program information delivering service. As the favorites information, it is possible to set program categories such as sports, news, weather forecast, drama, variety, anime, etc; name of the cast; broadcast date-and-time and the like, and the favorites information above described is registered in the personal information database 16 by the user of the portable telephones at the time of registration of the program information delivering service. Although the favorites information registered in the personal information database 16 can be modified, the method of doing it is not restricted but optional, that is, such methods are possible as the method of inputting the favorites information into the personal information database 16 by an operator based on the modified contents specified by the user and the method of automatically modifying the favorites information by transmitting the modified data from the portable telephone 14 to the center station 11. The retrieving unit 21 refers to the personal information database 16 in which the favorites information for each user is registered as described above, and, by utilizing these favorites information as the retrieving conditions set for each user, retrieves the EPG data of the program satisfying the retrieving conditions for each user. As a result of the retrieval, if a program is retrieved, the destination information for transmitting data to the portable telephone of the user who has set the retrieving conditions (for example, the electronic mail address of the portable telephone, the address information for transmitting and receiving the EPG data or the like is possible) and the EPG data of the retrieved program will be output to the transmitting unit 22. The retrieving unit 21 is adapted to perform the retrieving process of the registered favorites information of the user when the contents of the above described EPG database 20 are updated.

The transmitting unit 22 transmits the EPG data to the portable telephone 14 of the user who has registered the retrieving conditions, via the communication network 10, the EPG data being retrieved by the retrieving unit 21 for each user. The transmitting unit 22 starts the process of transmitting the EPG data to the portable telephone 14, when transmission conditions stored in the transmission condition storing unit 23 are satisfied. In the transmission-conditions-storing-unit 23, the transmission conditions are set for each portable telephone of the user registered with this service. As such conditions, the user is allowed to register a condition that when three or more programs are retrieved, the transmitting process should be started; a condition that, for a particular category, the transmitting process should be started at the time when one program is retrieved, and that, for other categories, the transmitting process should be performed at the time when five programs are retrieved; or a condition that the transmitting process should be performed one hour before the broadcast time of the retrieved program. Thus, until the transmission conditions are satisfied, the transmitting unit 22 reserves the EPG data to be destined to the user, the data having been sent from the retrieving unit 21. When the transmission conditions are satisfied, the reserved EPG data will be transmitted. The transmission conditions stored in the transmission-conditions-storing-unit 23 can also be changed properly, like the above described favorites information.

Under the above configuration, for example, when one user has registered the favorites information, such as "professional baseball*KYOJIN-SEN", the retrieving unit 21 extracts the EPG data of the program for the professional baseball game relay of the KYOJIN-SEN. If the user has set a transmission condition that the transmitting process should be performed immediately after the retrieval, the EPG data of the program for the professional baseball game relay of the KYOJIN-SEN will be transmitted toward the portable telephone 14 carried by the user. Here, the mark "*" in the above favorites information indicates a logical AND operation.

A-4. Structure of the Portable Telephone

Referring now to FIG. 3, the portable telephone 14 which receives the EPG data transmitted from the center station 11 will be explained. As shown in the figure, the portable telephone 14 comprises a radio communication unit 30, a controller 31, an input key including a plurality of keys, a speaker 33, a microphone 34, a display (displaying means) 35, and a memory (program-information-storing-means) 36, each of these elements having functions similar to that of a general portable telephone, thereby allowing to communicate between it and the other telephones.

The radio communication unit 30 wirelessly communicates with the base station 10a, and it performs voice communication like the general portable telephones do. Further, the radio communication unit 30 receives the EPG data transmitted from said center station 11 (refer to FIG. 1 and FIG. 2), and sends it to the controller 31.

The controller 31 controls each part of the portable telephone 14, and controls the voice communication like the general portable telephones do. Also, the controller 31 stores the EPG data received from the center station 11 in the memory 36, and when the user instructs a displaying operation, the controller displays the program guide information. corresponding to the received EPG data on the display 35. Further, the controller 31 produces a control command (program recording instruction information) for controlling the recording operation of the VTR 6 in the home 12 (refer to FIG. 1) in accordance with the instructions from the user input from the input keys 32, etc, and sends the control command to the radio communication unit 30. The radio communication unit 30 transmits the control command to the VTR 6 via the communication network 10. Thus, in the present embodiment, the radio communication unit 30 and the controller 31 constitutes recording-instruction-transmitting-means.

Figure 4B:
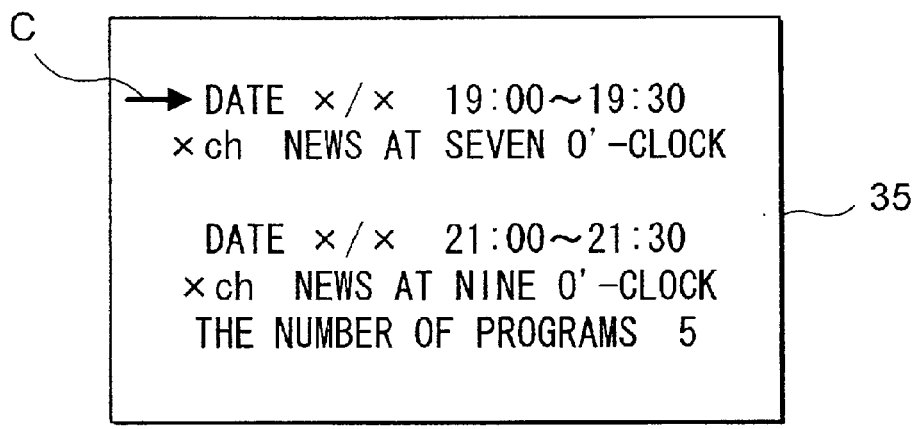

Referring now to FIG. 4, an example of the contents displayed on the display 35 under the control of the controller 31 in the case of displaying the program guide information will be explained. As illustrated in FIG. 4(a), when the EPG data transmitted from the center station 11 is received, the display 35 displays the reception of the EPG data by a message in accordance with the control of the controller 31, and also functions as a GUI (graphical user interface) for enabling the user to instruct whether the program information should be displayed or not. If the user operates the input key 32 to select the item "YES", the display 35 displays, as shown in FIG. 4(b), the information comprising the broadcast date-and-time of the program, channel, and program names (referred to as "program basic information" hereinafter). In the portable telephone 14, the number of the programs contained in the received EPG data, that is, the number of the retrieved programs is adapted to be displayed at the lower part of the display 35, and even when too many programs have been retrieved to be displayed on one screen, all the program guide information of such retrieved programs sent to the portable telephone are allowed to be displayed by operating the input key 32 so as to display such program guide information by sequentially scrolling the information.

Figure 4C:
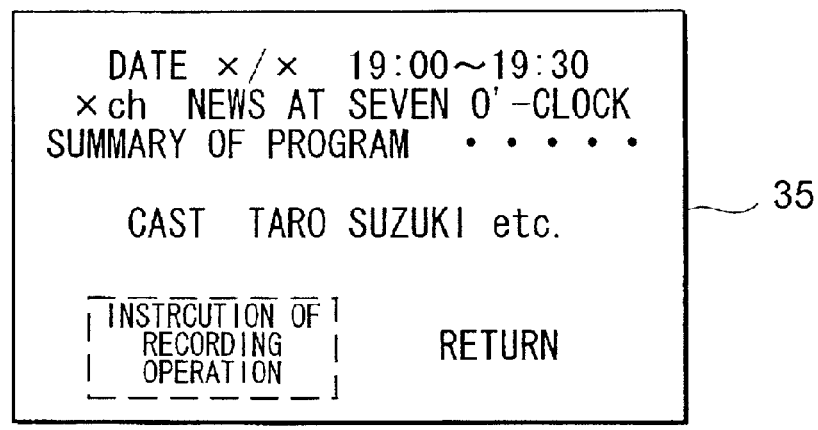

If the user operates the input key 32 to put the cursor C on the program basic information of the desired program so that the desired program is selected, the detailed information (referred to as "program detailed information" hereinafter) of the selected program will be displayed as shown in FIG. 4(c). In the program detailed information, the summary of the program, the names of the cast, etc, are displayed to an extent that is described in the television columns of the newspapers. Further, at this time, a mark is displayed at the lower part of the screen of the display 35, the mark being used for directing whether the recording operation of the program should be instructed or the screen should be returned to the previous screen, so that the mark functions as the GUI. When the user instructs the recording operation, the controller 31 produces the control command including the broadcast date-and-time of the program and the channel data, and send the command to the radio communication unit 30. The radio communication unit 30 establishes a communication connection between it and the VTR 6 described later via the communication network 10 based on a destination information (for example, the telephone number, etc) for transmitting data to the pre-selected home 12, and transmits the control command to the VTR 6 in the home 12 (refer to FIG. 1) via the communication network 10. On the other hand, when the user instructs the "returning operation" by utilizing the GUI such as shown in FIG. 4(c), the screen will be returned to the one displaying the program basic information, as shown in FIG. 4 (b). Also, even if either of the screens is displayed, when a predetermined key, for example, the on-hook key among the input keys 32, is pushed down, the screen will be returned to the initial screen (for example, a time displaying screen). The displaying mode of the EPG is not limited to the one in which the program basic information and the program detailed information are displayed hierarchically as shown in FIG. 4(a) to (c), but it is optional, and also the type of the information to be displayed is not limited to the above, but it is optional.

A-5. Structure of the VTR

Figure 5:
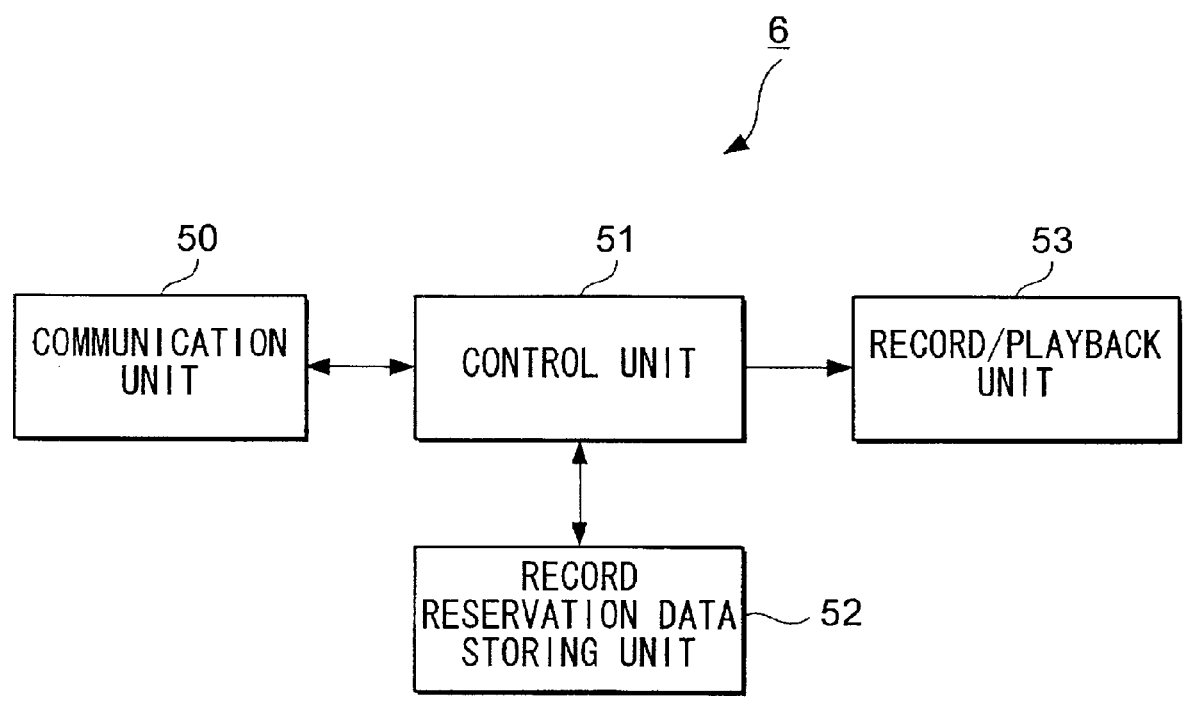
FIG. 5 is a block diagram showing a functional configuration of a VTR which is an element of said communicating system.

Next, FIG. 5 is a block diagram showing a functional configuration of the VTR 6, which is set in the home 12. As shown in the figure, the VTR 6 comprises a communication unit (instruction-information-receiving-means) 50, a control unit 51, a record-reservation-data-storing-unit 52, a record/playback unit (recording-operation-executing-means) 53.

The communication unit 50 communicates with other communication equipment via the communication network 10 (refer to FIG. 1), and the unit receives the control command transmitted from the above described portable telephone 14 to send it to the control unit 51. The control unit 51 instructs a video playback operation and the recording operation to the record/playback unit 53 in accordance with the user's instructions input from the input key, the remote controller, etc, of the VTR 6 which are not shown in figures. Further, the broadcast date-and-time and channel, which are included in the control command received by the communication unit 50, are written into the record-reservation-data-storing-unit 52 as record reservation data. Then, the control unit 51 instructs to execute the recording operation to the record/playback unit 53, based on the record-reservation data stored in the record-reservation-data-storing-unit 52. The record/playback unit 53 executes the recording operation in accordance with the broadcast date-and-time and channel instructed from the control unit 51. Although the communication unit 50 may be the one dedicated to the receiving operation, it is also possible to add thereto a transmission function so that the data for confirming the receipt of the control command from the portable telephone 14 is returned to the portable telephone 14. Further, it is possible to send the information concerning the remaining amount of the video tape which is set in the VTR 6, to the portable telephone 14.

B. Operation of the Embodiment

Next, the operation of the communicating system having the above configuration will be explained below. In the following, an operation of the center station 11 for retrieving the EPG data to be transmitted to the portable telephone 14, an operation of the portable telephone 14 for receiving the EPG data to transmit the instruction of the recording operation to the VTR 6, and an operation of the VTR 6 for receiving the instruction of the recording operation from the portable telephone 14 to execute the recording operation, will be separately explained.

B-1. Operation of Transmitting EPG Data by the Center Station

Figure 6:
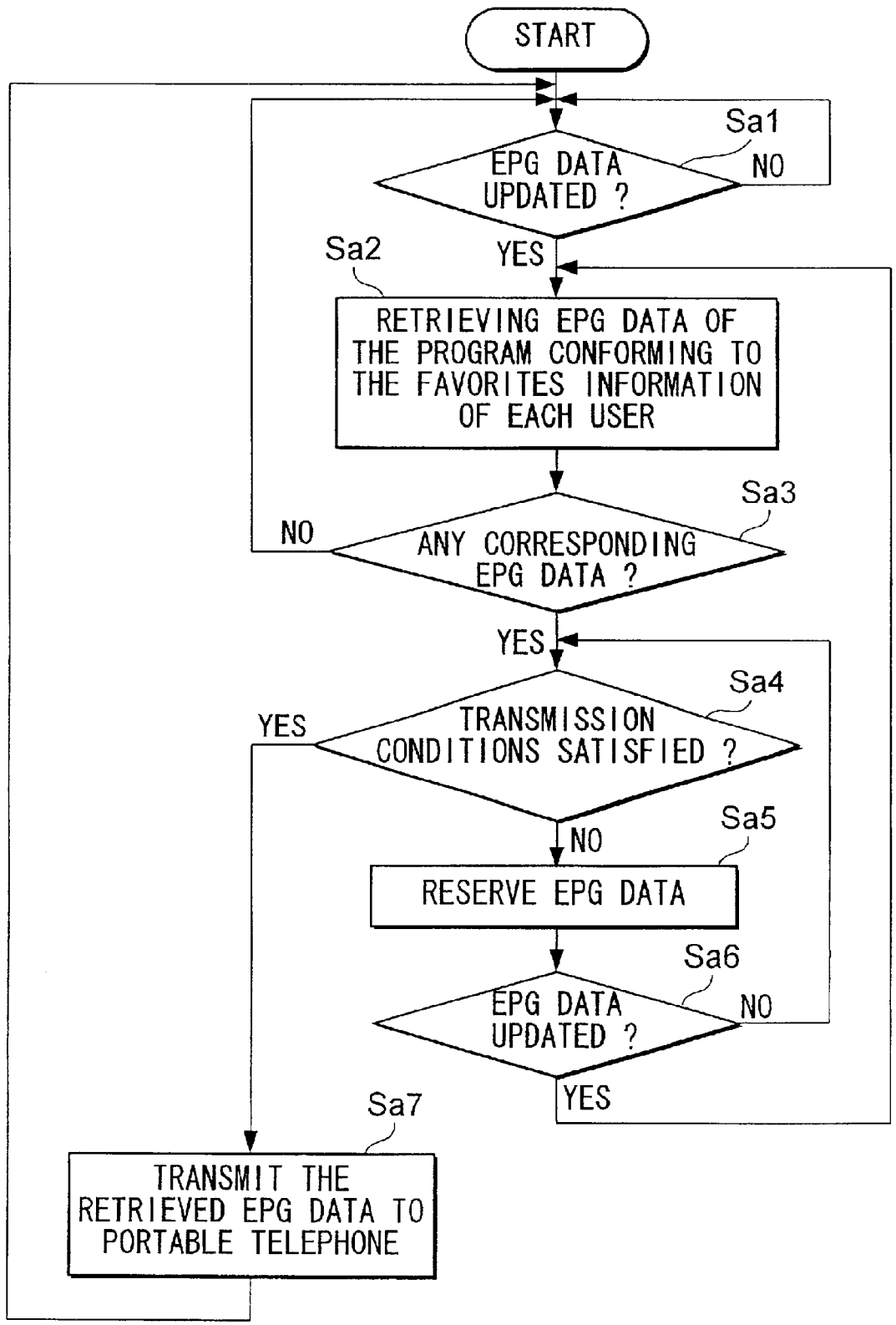
FIG. 6 is a flow chart illustrating a procedure for transmitting program guide data by means of said center station.

First, the transmitting operation of the EPG data by means of the center station 11 will be explained with reference to FIG. 6. As illustrated in the figure, at the beginning, whether the EPG database 20 in the EPG server 15 has been updated or not will be confirmed (step Sa1). If the EPG database 20 has been updated, then by utilizing the favorites information as retrieving conditions, programs satisfying the retrieving conditions will be retrieved by the retrieving unit 21 for each of the users, the favorites information being registered in the personal information database 16 for each user's portable telephone 14 (step Sa2).

After this, it will be determined for each of the users whether the programs satisfying the retrieving conditions are found or not (step Sa3), and if the EPG data of the satisfied program is retrieved, then it will be determined whether the user's transmission conditions registered in the transmission-conditions-storing-unit 23 are satisfied (step Sa4). If the transmission conditions are satisfied, then the retrieved EPG data will be transmitted toward the corresponding portable telephone 14 (step Sa7).

On the other hand, if the transmission conditions are not satisfied, the retrieved EPG data will be reserved (step Sa5) After this, if the EPG data in the EPG database 20 is updated, the process will be returned to the step Sa2 to repeat the operations in the step Sa3 and step Sa4. If the transmission conditions are not satisfied again, the EPG data of the retrieved programs will be further reserved (step Sa5). These operations are repeated, and if the transmission conditions are satisfied (the determination in the step Sa4 becomes the item "YES"), then the reserved EPG data will be transmitted to the corresponding portable telephone 14 (step Sa7). If the transmission condition is that the EPG data should be transmitted one hour before the broadcast date-and-time of the retrieved program, only the EPG data of the program satisfying this transmission condition, that is, the program having the broadcast date-and-time one hour before the actual broadcast date-and-time will be transmitted.

B-2. Operatioin of the Portable Telephone

Figure 7:
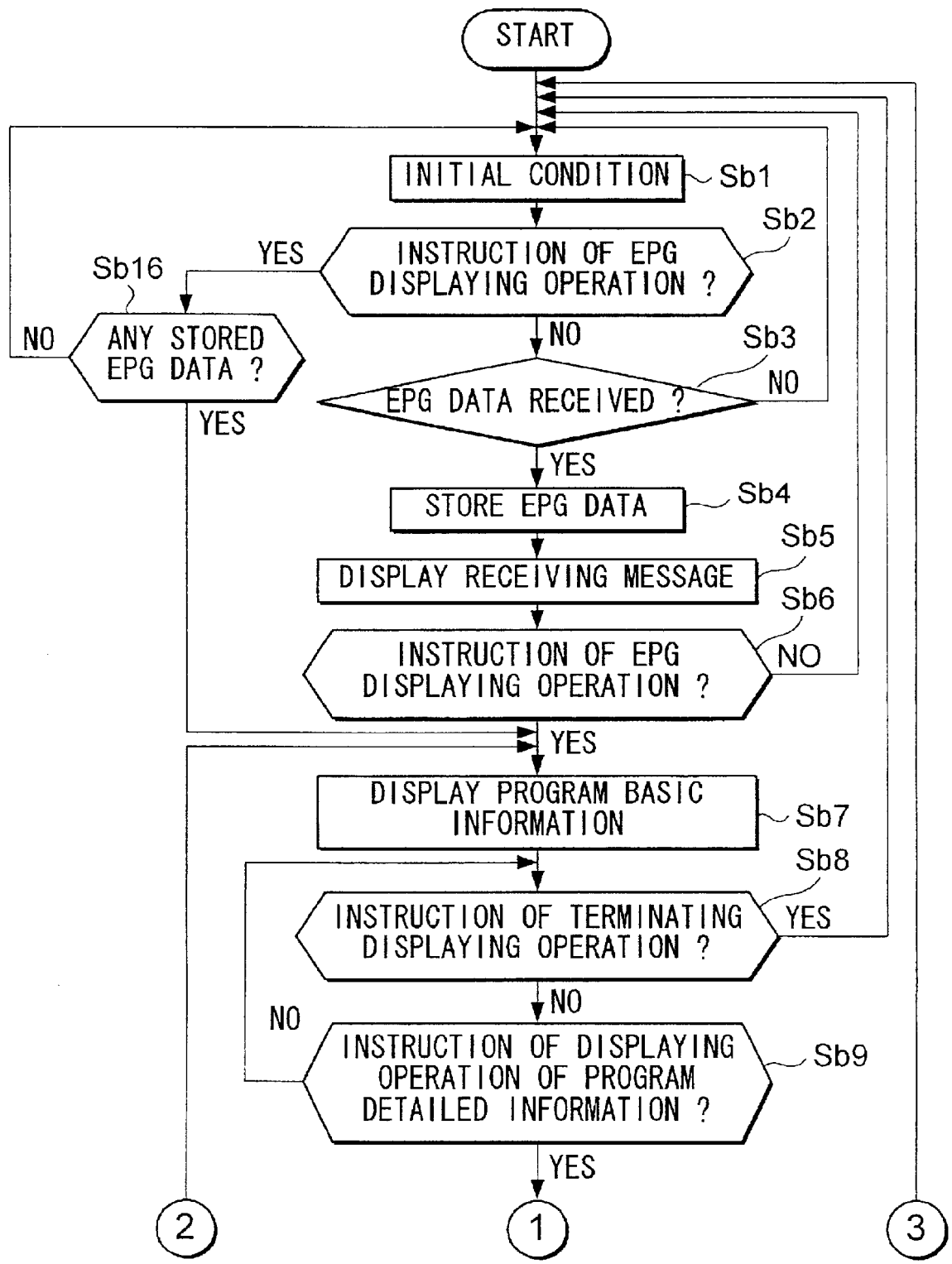
FIG. 7 is a flow chart illustrating a process procedure of said portable telephone in receiving said program guide data and instructing a recording operation.
Figure 8:
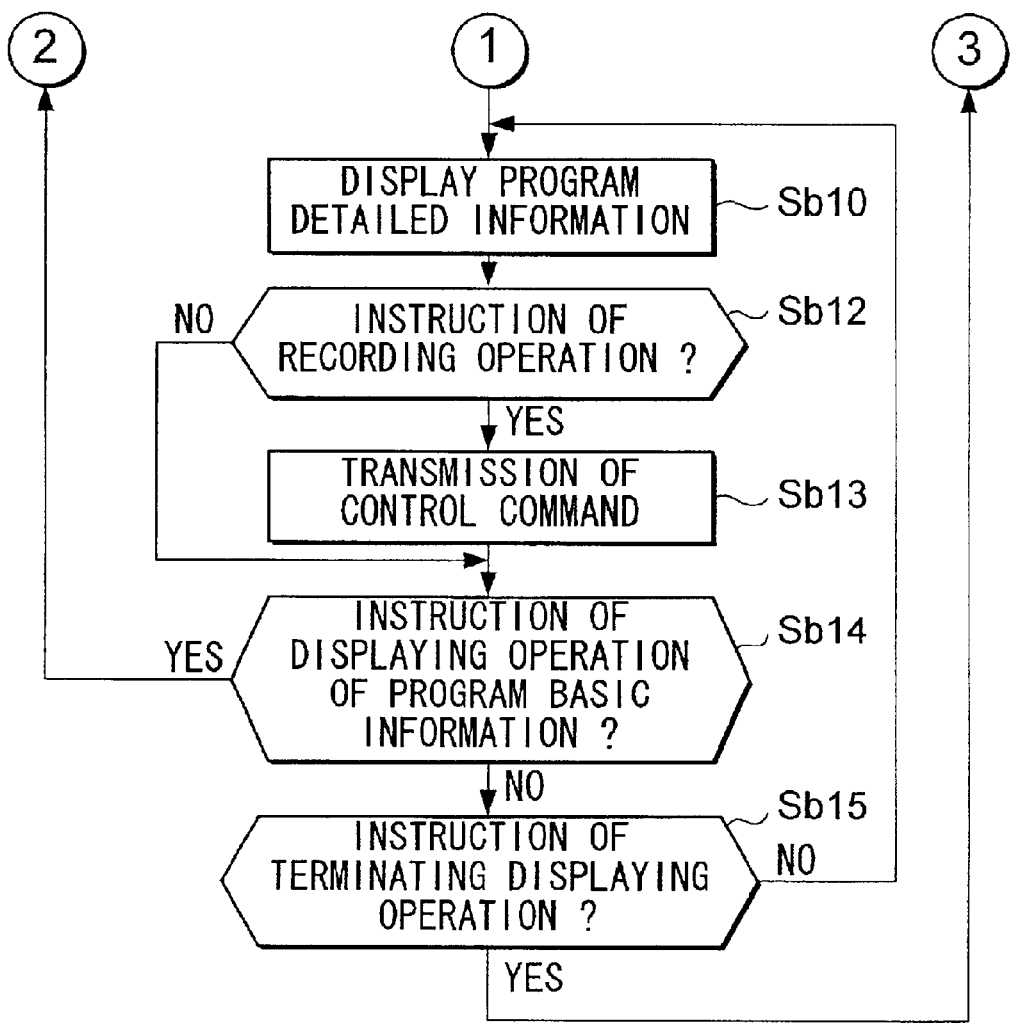
FIG. 8 is a flow chart illustrating a process procedure of said portable telephone in receiving said program guide data and instructing a recording operation.

Next, the operation of the portable telephone 14 in the case where it receives the EPG data transmitted from the center station 11 to instruct the recording operation to the VTR 6 in the home 12 as described above will be explained with reference to FIG. 7 and FIG. 8. As illustrated in FIG. 7 and FIG. 8, at the beginning, when the power is supplied to the portable telephone 14, an initial screen such as a time display will be displayed on the display 35 (step Sb1). Then, it will be determined whether or not a displaying operation of the EPG data is instructed from the user (step Sb2), and if there is the instruction of the displaying operation, it will be determined whether or not the EPG data is stored in the memory 36 (step Sb16). If the EPG data is not stored, the process will be returned to the initial condition (step Sb1), and if the EPG data is stored, the program basic information (refer to FIG. 4(b)) will be displayed based on the stored EPG data (step Sb7).

On the other hand, in the step Sb2, if there is no instruction of the displaying operation from the user, the confirmation whether the EPG data has been received or not will be made (step Sb3). In the case where the EPG data from the center station 11 is received, the EPG data will be stored in the memory 36 (step Sb4), and the display 35 displays the receipt message (refer to FIG. 4(a)) (step Sb5).

In a situation shown in FIG. 4(a), it is determined whether or not there is an instruction of the EPG displaying operation from the user, that is, which of the items, "YES" or "NO", is selected on the displayed screen (step Sb6), and if the item "YES" is selected, then the program basic information (refer to FIG. 4(b)) will be displayed on the display 35 (step Sb7). On the other hand, if the item "NO" is selected, the process will be returned to the initial state (step Sb1).

When the program basic information is displayed on the display 35 (step Sb7), it is determined whether the termination of the EPG displaying operation is instructed from the user or not (step Sb8), and if the termination of the displaying operation is instructed, the process will be returned to the initial state such as the time display (step Sb1). On the other hand, if there is no instruction of the termination of the EPG displaying operation, it is determined whether or not there is an instruction of the displaying operation of the program detailed information from the user (step Sb9). If there is an instruction of the displaying operation of the program detailed information, that is, a program is selected on the screen shown in FIG. 4(b), the program detailed information of the program (refer to FIG. 4(c)) will be displayed on the display 35 (step Sb10).

In a situation where the program detailed information is displayed, it is determined whether or not there is an instruction of the recording operation from the user (step Sb11), and if there is an instruction of the recording operation, the control command including the broadcast date-and-time and channel of the program will be produced, and then the produced control command will be transmitted to the VTR 6 in the home 12 (step Sb13).

After this, it is determined whether or not there is an instruction of the displaying operation of the basic program information, that is, whether or not the "return operation" is selected on the screen shown in FIG. 4(c) (step Sb14). If the "return operation" is selected, the program basic information shown in FIG. 4(b) is displayed (step Sb7), and the processes of and after the step 7 will be repeated. On the other hand, unless the "return operation" is selected, it is determined whether or not there is an instruction of the termination of the EPG displaying operation (step Sb15). If there is the instruction of the termination, the process will be returned to the initial state (step Sb1), and if not, the program detailed information will remain to be displayed (step Sb10).

B-3. Operation of the VTR

Figure 9:
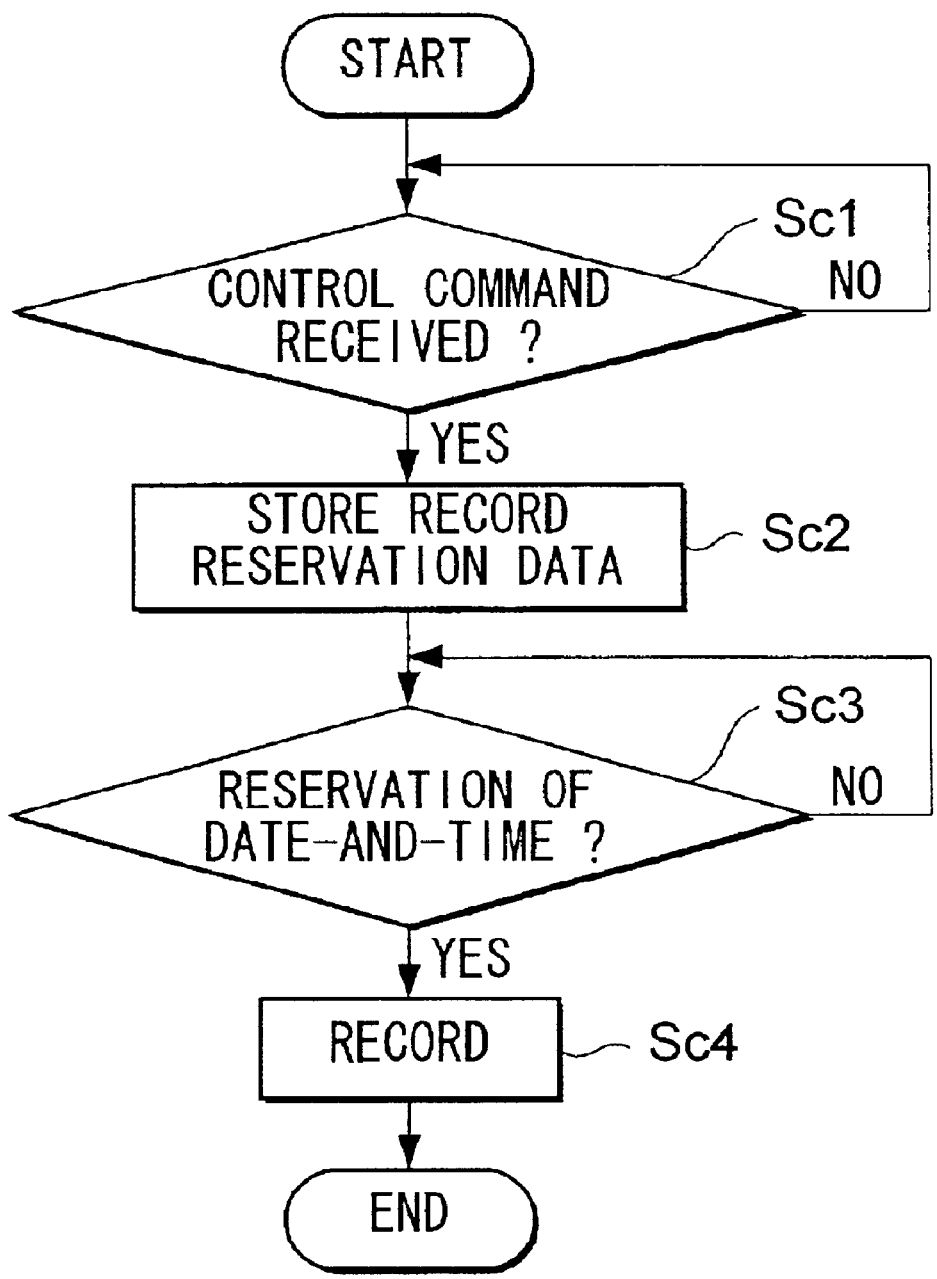
FIG. 9 is a flow chart illustrating a process procedure of said VTR in receiving a control command from said portable telephone and executing a recording operation.

Next, the operation of the VTR 6 for receiving the control command transmitted from the portable telephone 14, so as to execute the recording operation, as above described will be explained with reference to FIG. 9. As illustrated in the figure, at the beginning, it will be determined whether or not the control command transmitted from the portable telephone 14 is received (step Sc1) . When the control command is received, the record-reservation data will be produced by the control unit 51 from the information such as the broadcast date-and-time, channel and the like included in the received control command, and then the record-reservation data will be stored in the record-reservation-data-storing-unit 52 (step Sc2).

When it reaches the date-and-time indicated by the record-reservation data stored in the record-reservation-data-storing-unit 52 (step Sc3), the recording process of the program to be broadcast on the channel instructed by the record-reservation data will be started (step Sc4) . After this, when it reaches the recording-termination time indicated by the record-reservation data, the recording process will be terminated.

Thus, in the transmitting system of the present embodiment, even when the user is outside the home, he can obtain, by utilizing his own portable telephone 14, the EPG data of the program conforming to the favorites information which is set by each user. Referring to the EPG data, the record-reservation of a desired program can be made to the VTR 6 in the home 12. Thus, the user can properly instruct the recording operation of the desired program from outside the home, without memorizing the program list with an increased amount of information as the broadcasting is multi-channeled.

Further, in the transmitting system in accordance with the present embodiment, when the EPG data from the center station 11 to the portable telephone 14 is transmitted, only the EPG data conforming to the favorite of its user will be transmitted. That is, since the EPG data of the unnecessary program for the user is not transmitted, the portable telephone with its small quantity of memory is prevented from being subjected to pressure. Further, since the EPG data of the program conforming to the user's favorites information has been transmitted in advance, the number of the programs to be transmitted will be limited to some extent, and therefore even when utilizing the terminal having a small display screen as the portable telephone 14, the desired program can be found easily and in a short time with reference to the EPG. Further, by hierarchically displaying the program basic information and the program detailed information as above described, the visual-recognition-ability and the operability can be improved.

Further, in the present embodiment, the EPG data transmitting process of the so-called push type is performed, in which type, when the program conforming to the user's favorites is retrieved among the programs to be broadcast, the EPG data will be transmitted to the portable telephone 14. To the contrary, in the case where the EPG data is obtained from the center station 11 by accessing thereto from the portable telephone 14, if the program conforming to the favorites information is not retrieved, no information will be obtained even if such an access is made, thus resulting in a useless access. However, in the present embodiment, since the EPG data transmitting process of the push type is performed, the useless access from the portable telephone 14 to the center station 11 as described above can be prevented.

Further, since each user can set transmitting conditions of the EPG data, if the conditions are set such that the EPG data should be transmitted one hour before the broadcast time, the EPG data will be transmitted to the portable telephone 14 owned by the user one hour before the broadcasting of the program. The user can find the EPG data to go home and watch the program, or to instruct the record-reservation operation to the VTR 6 from the portable telephone 14 when he cannot go home. Further, in the case where a user registers a plurality of favorites information in the personal information database 16, he will be allowed to set conditions, for example, a condition that when a program is retrieved based on a predetermined favorites information, the EPG data should be transmitted two times including at that point and at the time one hour before the broadcast, and when a programs is retrieved based on another favorites information, the EPG data should be transmitted only one time at that point. Further, not related to the set conditions of each user, it is possible to transmit the EPG data of the program (including the EPG data once transmitted) at the time before the broadcasting time which is set by the user (for example, one hour before the broadcasting time). Thereby, even if the user forgets the broadcast date-and-time of the program, he can be informed of the fact that it is the time before the broadcast time which is set for the program, so as to prompt the user to record and watch the program.

C. Modified Embodiments

Figure 10:
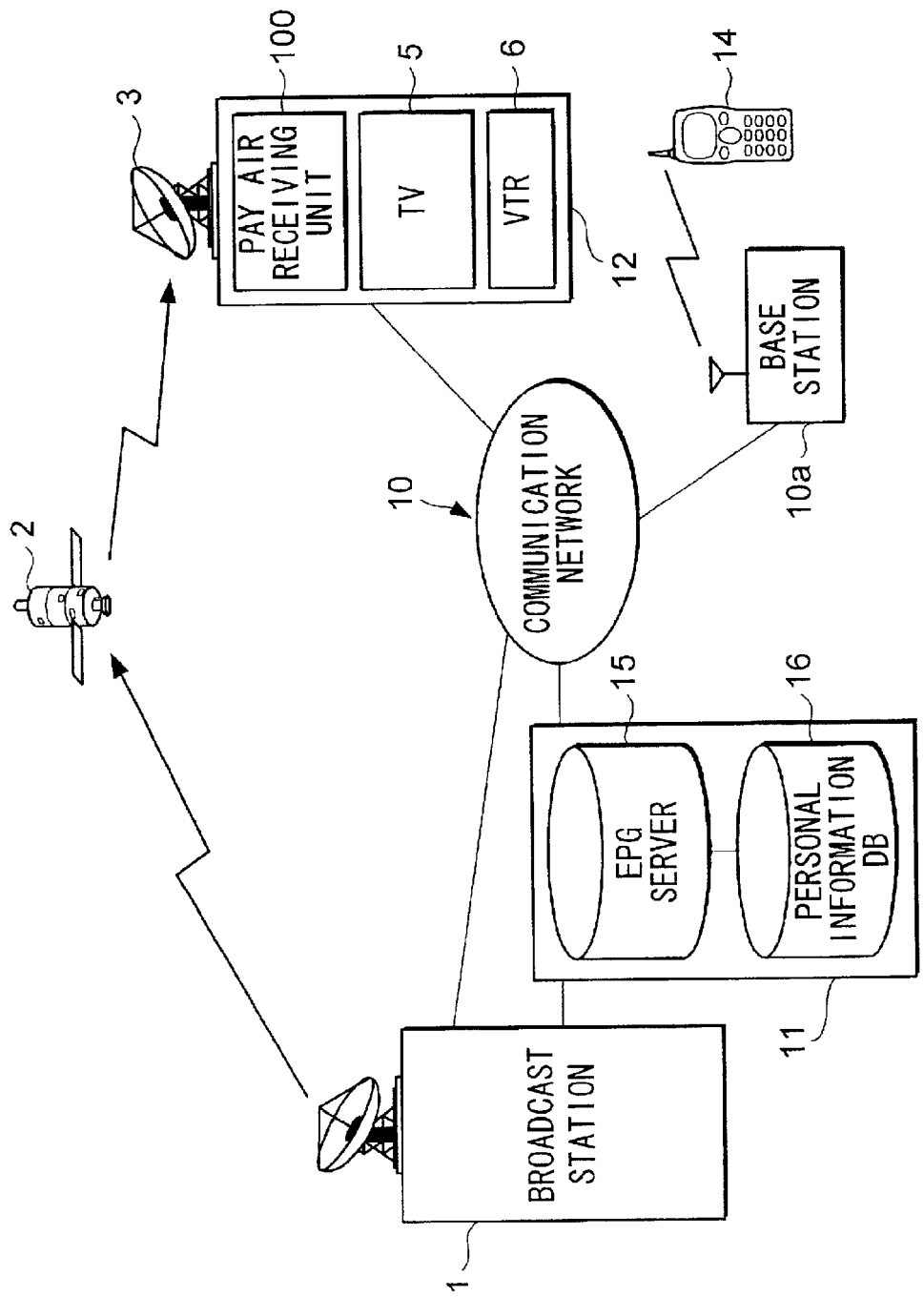
FIG. 10 is a diagram showing a modified embodiment of said communicating system.

The invention is not restricted to the above described embodiments, but the following various modifications will be possible:

(1) Although, in the above described embodiment, the case where the recording operation is instructed from the portable telephone 14 to the VTR 6 in the home 12 has been explained, the embodiment is not restricted thereto, but in the case of the broadcasting system serving a PPV (Pay Per View) system, it is possible to allow to instruct the purchasing operation of the desired program from the portable telephone 14. In this case, as shown in FIG. 10, the instruction of the program purchasing operation is transmitted from the portable telephone 14 to the broadcast station 1 via the communication network 10 with reference to the EPG data transmitted from the center station 11 as above described embodiment. In the broadcasting system providing the PPV service, the broadcast station 1 transmits the scrambled data of the program therefrom, but the broadcast station 1 which received the above described instruction of the program purchasing operation, transmits a watching allowance information on a specified program together with the scrambled data of the program. A pay air receiving unit 100 which is set in the home 12, receives the scrambled data of the program and the watching allowance information to de-scramble the data of the program which is allowed for the user to watch, so that the program instructed from the user to purchase can be watched.

Also, it is possible to transmit the instruction of the purchasing operation from the portable telephone 14 to the pay air receiving unit 100 in the home 12 via the communication network 10, and the pay air receiving unit 100 that has received this de-scrambles the scrambled data of the program transmitted from the broadcast station 1.

(2) Further, although in the above described embodiment, the EPG data is such that it is transmitted from the center station 11 to the portable telephone 14 capable of making a two-way communication, it is not restricted thereto, but the data can be transmitted to a simple-type portable telephone system (PHS: Personal Handy-phone System); a portable-type mobile communication terminal capable of wirelessly transmitting and receiving data over a wide area or local area; other mobile communication terminals; and a portable terminal with a radio communication function. Further, it is possible to transmit the EPG data to a pager having only a receiving function. In this case, if this pager is of the type having an interface with the public telephones, etc, capable of conducting a data transmission, it is possible to connect the public telephones and the pager, so that the instruction of the recording operation is transferred to the public telephones like the above described portable telephone 14 and subsequently transmitted to the home 12.

(3) Further, although in the above described embodiment, the program basic information comprising the broadcast date-and-time of the program and channel information and, on the other hand, the program detailed information comprising the summary of the program, cast and the like are transmitted as the EPG data, it is possible to voluntarily transmit only the program basic information from the center station 11 to the portable telephone 14. In this case, in the portable telephone 14 which has received the EPG data comprising only the program basic information, a display such as shown in FIG. 11(a) to (c) will be made. First, as shown in FIG. 11(a), the receipt message like the above described embodiment is displayed. Next, when the user instructs the EPG displaying operation, as shown in FIG. 11(b), the program basic information comprising the broadcast date-and-time, channel, and name of the program is displayed, and also the message such as "Obtain the detailed information ?" is displayed. If the user instructs to execute a detailed-information-obtaining-operation, the instruction of the detailed-information-obtaining-operation will be transmitted from the portable telephone 14 to the center station 11. The center station 11 which receives the instruction of the detailed-information-obtaining-operation transmits the detailed information of the program to the portable telephone 14. Thereby, as shown in FIG. 11(c), the detailed information showing the summary of the program, cast, etc, is displayed on the display 35. In a situation where the program basic information shown in FIG. 11(b) is displayed, when the user selects the item "instruction of the recording operation", the VTR 6 in the home 12 is instructed to execute a recording operation of the program without accessing to the center station 11 for obtaining the detailed information.

In this way, since it will prevent the portable telephone 14 from being transmitted the detailed information of unnecessary programs, the amount of the data to be transmitted to the portable telephone 14 can be controlled, and therefore the memory of the portable telephone 14 which receives the transmitted data can effectively be used. For example, if high-lighted image data and freeze-frame picture data for ten seconds, etc, of the program are included as the program detailed information, a user can refer to the high-lighted image, etc, by means of the portable telephone 14, thereby making it very useful for the user. However, the picture data of the high-lighted image, etc, are transmitted for a number of the programs, the amount of the data to be transmitted becomes large, and the memory of the portable telephone 14 receiving the data will be subjected to be pressure. As described in the present modification, if only the program basic information having a small amount of data is transmitted first, and the detailed information such as the high-lighted image is transmitted only when an instruction is received from the portable telephone 14 of the user who has looked the basic information, then the user can refer to the high-lighted image, etc, of the necessary program for him without greatly increasing the amount of data to be transmitted.

(4) Further, although in the above described embodiment, the VTR 6 has a function to receive the control command transmitted from the portable telephone 14, it is not restricted thereto, but an embodiment is possible such as to provide a receiving controller for receiving the control command from the portable telephone 14 and producing the record-reservation data to be written into the VTR, the receiving controller and the VTR being connected together by utilizing a cable or the like. Further, as a unit for recording the program, in addition to the above described VTR 6, other kinds of the recording units including a recorder for writing the program data into the storage media such as a hardware unit and DVD (Digital Versatile Disc) can be used.

(5) Further, as shown in FIG. 12, in addition to the above described embodiment, it is possible to provide a unit 110 for transmitting watching/recording information (history-information-obtaining-means), so that a watching/recording history of the user is transmitted to the center station 11, and a personal information setting unit (retrieving-conditions-writing-means) 120 in the center station 11 which has received the watching/recording history can automatically set the information in the personal information database 16.

As shown in FIG. 12, the unit 110 for transmitting watching/recording information comprises a storage device 111 for storing history information including the broadcast date-and-time and the channel information of the program tuned by the tuner 4 for a watching and recording purpose, and a transmitting device 112 for periodically transmitting the history information stored in the storage device to the personal information setting unit 120 of the center station 11 via the communication network 10.

FIG. 13 is a block diagram showing a functional configuration of the personal information setting unit 120 for automatically registering the favorites information in the personal information database 16 based on the watching/recording history information transmitted from the watching/recording information transmitting unit 110. As shown in the figure, the personal information setting unit 120 comprises a receiving device 121, a device 122 for registering the favorites information, and a program list database 123.

The receiving device 121 receives the watching/recording history information transmitted from the transmitting device 112 of the unit 110 for transmitting watching/recording information via the communication network 10. The device 122 for registering the favorites information specifies the program watched and/or recorded by the user, based on the broadcast date-and-time and the channel included in the watching/recording history information received by the receiving device 121 and the past program list data reserved in the program list database 123. Further, the program list database 123 stores the information concerning the category and the name of the cast of each program as well as the program list. By referring to the information, the device 122 for registering the favorites information specifies the category and the name of the cast of the program watched and/or recorded by the user. The device 122 for registering the favorites information registers the category and the cast of the specified program in the personal information database 16 as the favorites information for the user.

In this way, using the favorites information registered in the personal information database 16 as the retrieving conditions, the program is retrieved by the EPG server 15 (refer to FIG. 2) as above described embodiment, and transmitted to the portable telephone 14 carried by the user. Thus, it is allowed for the user to obtain the EPG data conforming to his favorite by the portable telephone 14, without the operation of registering the favorites information in the personal information database 16.

(6) Further, although in the above described embodiment, the control command is transmitted from the portable telephone 14 to the VTR 6 in the home 12 via the communication network 10, it is not restricted thereto, but it is possible to transmit the data for specifying the program to be recorded from the portable telephone 14 to the center station 11, so that the control command is transmitted from the center station 11 which has received the data to the VTR 6 in the home 12 via the communication network 10.

(7) Further, although in the above described embodiment, the case has been explained where the invention is applied to a satellite broadcasting system for transmitting the broadcast radio wave from the broadcast station 1 to the home 12 via the satellite 2, it is not restricted thereto, but the invention may be applied to other broadcasting systems such as a ground wave broadcasting system and a cable wave broadcasting system as well as the radio broadcasting.

What is claimed is:

1. An apparatus for wirelessly transmitting program information concerning a program to be broadcast, to a plurality of radio communication terminals, comprising:

a program information database in which program information concerning a program to be broadcast is reserved;

retrieving-conditions-storing-means for storing retrieving conditions which are set corresponding to the plurality of radio communication terminals;

retrieving means for retrieving a program satisfying the retrieving conditions stored in said retrieving-conditions-storing-means from said program information database; and transmitting means for voluntarily transmitting, when a program satisfying said retrieving conditions is retrieved by means of said retrieving means, the program information concerning said retrieved program to said radio communication terminals corresponding to said retrieving conditions.

2. An apparatus for transmitting program information as defined in claim 1, further comprising transmission-conditions-storing-means for storing transmission conditions corresponding to said radio communication terminal, said transmission conditions being used for transmitting the program information retrieved by said retrieving means to said radio communication terminal,
    wherein said transmitting means transmits the program information to said radio communication terminal corresponding to said transmission conditions, when the transmission conditions stored in said transmission-conditions-storing-means are satisfied.

3. An apparatus for transmitting program information as defined in claim 1, wherein said transmitting means transmits the program information retrieved by said retrieving means to said radio communication terminal, when it reaches a time that is a predetermined time before the start of broadcasting of the program.

4. An apparatus for transmitting program information as defined in any one of the claims 1 to 3, wherein the program information reserved in said program information database includes a basic information including the broadcast date-and-time of the program, channel, and program name information, and a detailed information concerning the contents of the program, the amount of said detailed information being larger than that of said basic information;
    and wherein said transmitting means voluntarily transmits said basic information of the program retrieved by said retrieving means to said radio communication terminal, and subsequently transmits said detailed information of the program retrieved by said retrieving means when an instruction is provided from said radio communication terminal.

5. An apparatus for transmitting program information as defined in claim 4, said apparatus further comprising:
    history-information-obtaining-means for obtaining history information concerning a watching operation, a recording operation or both of these operations of the user, for the program broadcast in the past; and
    retrieving-conditions-writing-means for setting, based on the history information obtained by said history-information-obtaining-means, the retrieving conditions corresponding to said radio communication terminal of said user, so as to write the retrieving conditions into said retrieving-conditions-storing-means.

6. An apparatus for transmitting program information as defined in any one of claims 1 to 3, said apparatus further comprising:
    history-information-obtaining-means for obtaining history information concerning a watching operation, a recording operation or both of these operations of the user, for the program broadcast in the past; and
    retrieving-conditions-writing-means for setting, based on the history information obtained by said history-information-obtaining-means, the retrieving conditions corresponding to said radio communication terminal of said user, so as to write the retrieving conditions into said retrieving-conditions-storing-means.

7. An apparatus for transmitting program information as defined in claim 1, wherein the retrieving conditions comprises personal information of users of the communication terminals.

8. An apparatus for transmitting program information as defined in claim 7, wherein the personal information is registered by the users of the communication terminals.

9. An apparatus for transmitting program information as defined in claim 8, wherein the personal information is capable of being modified.

10. An apparatus for transmitting program information as defined in claim 1, wherein at least a part of the retrieving conditions are different for at least two of the communication terminals.

11. A communicating system comprising a plurality of radio communication terminals for performing radio communication; a program-information-transmitting-apparatus for transmitting information concerning a program to be broadcast to said radio communication terminals; a program recording apparatus for recording a program to be broadcast; and a communication network connecting the apparatuses with one another,
    wherein said program-information-transmitting-apparatus has a program information database in which program information concerning a program to be broadcast is reserved; retrieving-conditions-storing-means for storing retrieving conditions which are set corresponding to said plurality of radio communication terminals; retrieving means for retrieving a program satisfying the retrieving conditions stored in said retrieving-conditions-storing-means from said program information database; and transmitting means for voluntarily transmitting, when a program satisfying the retrieving conditions is retrieved by means of said retrieving means, a program information concerning the retrieved program to said radio communication terminals corresponding to said retrieving conditions;
    said radio communication terminals have program-information-storing-means for storing a program information transmitted from said program-information-transmitting-apparatus; displaying means for displaying a program information stored in said program-information-storing-means; and recording-instruction-transmitting-means for transmitting recording-instruction-information instructing a program recording operation to said program recording apparatus via said communication network; and
    said program recording apparatus has instruction-information- receiving-means for receiving said recording-instruction-information transmitted via said communication network and recording-operation-executing-means for recording a program to be broadcast in accordance with the recording-instruction-information received by said instruction-information-receiving means.

12. A communicating system comprising a plurality of radio communication terminals for performing radio communication; a program-information-transmitting-apparatus for transmitting information concerning a program to be broadcast to said radio communication terminals; a program-providing-apparatus for providing a program to the user when a registered user purchases the program; and a communication network connecting the apparatuses with one another,
    wherein said program-information-transmitting-apparatus has a program information database in which program information concerning a program to be broadcast is reserved; retrieving-conditions-storing-means for storing retrieving conditions which are set corresponding to said plurality of radio communication terminals-retrieving means for retrieving a program satisfying the retrieving conditions stored in said retrieving-conditions-storing-means from said program information database; and transmitting means for voluntarily transmitting, when a program satisfying said retrieving conditions is retrieved by means of said retrieving means, the program information concerning the retrieved program to said radio communication terminals corresponding to said retrieving conditions;
    said radio communication terminals have program-information-storing means for storing a program information transmitted from said program-information-transmitting-apparatus; displaying means for displaying a program information stored in said program information storing means; and purchasing-instruction-transmitting-means for transmitting purchasing-instruction-information instructing a program purchasing operation to said program-providing-apparatus via said communication network; and said program-providing-apparatus has purchasing-information-receiving-means for receiving a purchasing-instruction-information transmitted via said communication network and program-providing-means for providing a program to the user in accordance with the purchasing-instruction-information received by said purchasing-information-receiving means.

13. A communicating system as defined in claim 11 or 12, wherein said program-information-transmitting-apparatus further comprises transmission-conditions-storing means for storing transmission conditions corresponding to said radio terminal, said transmission conditions being used for transmitting the program information retrieved by said retrieving means to said radio communication terminal;

wherein said transmitting means transmits the program information to said radio communication terminal corresponding to said transmission conditions, when the transmission conditions stored in said transmission-conditions-storing-means are satisfied.

14. A communicating system as defined in claim 13, wherein the program information reserved in said program information database includes a basic information including the broadcast date-and-time of the program, channel, and program name information and a detailed information concerning the contents of the program, the amount of said detailed information being larger than that of said basic information;

said transmitting means voluntarily transmits said basic information of the program retrieved by said retrieving means to said radio communication terminal, and subsequently transmits said detailed information of the program retrieved by said retrieving means when an instruction is provided from said radio communication terminal.

15. A communicating system as defined in claim 13, said system further comprising history-information-obtaining-means connectable to said communication network, for obtaining history information concerning a watching operation, a recording operation or both of these operations, of the user, for the program broadcast in the past, so as to transmit the history information to said program-information-transmitting-apparatus;

wherein said program-information-transmitting-apparatus has retrieving-conditions-writing-means for setting, based on the history information transmitted from said history-information-obtaining-means, the retrieving conditions corresponding to said radio communication terminal of said user, so as to write the retrieving conditions into said retrieving-conditions-storing-means.

16. A communicating system as defined in claim 11 or 12, wherein said transmitting means transmits the program information retrieved by said retrieving means to said radio communication terminal, when it reaches a time that is a predetermined time before the start of broadcasting of the program.

17. A communicating system as defined in claim 16, wherein the program information reserved in said program information database includes a basic information including the broadcast date-and-time of the program, channel, and program name information and a detailed information concerning the contents of the program, the amount of said detailed information being larger than that of said basic information;

said transmitting means voluntarily transmits said basic information of the program retrieved by said retrieving means to said radio communication terminal, and subsequently transmits said detailed information of the program retrieved by said retrieving means when an instruction is provided from said radio communication terminal.

18. A communicating system as defined in claim 16, said system further comprising history-information-obtaining-means connectable to said communication network, for obtaining history information concerning a watching operation, a recording operation or both of these operations, of the user, for the program broadcast in the past, so as to transmit the history information to said program-information-transmitting-apparatus;

wherein said program-information-transmitting-apparatus has retrieving-conditions-writing-means for setting, based on the history information transmitted from said history-information-obtaining-means, the retrieving conditions corresponding to said radio communication terminal of said user, so as to write the retrieving conditions into said retrieving-conditions-storing-means.

19. A communicating system as defined in claim 11 or 12, wherein the program information reserved in said program information database includes a basic information including the broadcast date-and-tine of the program, channel, and program name information and a detailed information concerning the contents of the program, the amount of said detailed information being larger than that of said basic information;

said transmitting means voluntarily transmits said basic information of the program retrieved by said retrieving means to said radio communication terminal, and subsequently transmits said detailed information of the program retrieved by said retrieving means when an instruction is provided from said radio communication terminal.

20. A communicating system as defined in claim 19, said system further comprising history-information-obtaining-means connectable to said communication network, for obtaining history information concerning a watching operation, a recording operation or both of these operations, of the user, for the program broadcast in the past, so as to transmit the history information to said program-information-transmitting-apparatus;

wherein said program-information-transmitting-apparatus has retrieving conditions-writing-means for setting, based on the history information transmitted from said history-information-obtaining-means, the retrieving conditions corresponding to said radio communication terminal of said user, so as to write the retrieving conditions into said retrieving-conditions-storing-means.

21. A communicating system as defined in claim 11 or 12, said system further comprising history-information-obtaining-means connectable to said communication network, for obtaining history information concerning a watching operation, a recording operation or both of these operations, of the user, for the program broadcast in the past, so as to transmit the history information to said program-information-transmitting apparatus;

wherein said program-information-transmitting-apparatus has retrieving-conditions-writing-means for setting, based on the history information transmitted from said history-information-obtaining-means, the retrieving conditions corresponding to said radio communication terminal of said user, so as to write the retrieving conditions into said retrieving-conditions-storing-means.

22. A method of wirelessly transmitting a program information concerning a program to be broadcast to a plurality of radio communication terminals, said method comprising the steps of:

a retrieving step of retrieving a program satisfying retrieving conditions which are set corresponding to the radio communication terminals, from a program information database in which program information concerning a program to be broadcast is reserved; and a transmitting step of, when a program satisfying said retrieving conditions is retrieved in said retrieving step, voluntarily transmitting a program information concerning the retrieved program to said radio communication terminal corresponding to said retrieving conditions.

23. A method of transmitting program information as defined in claim 22, wherein, in said transmitting step, when the transmission conditions which are set corresponding to said radio terminal are satisfied, the program information retrieved in said retrieving step is transmitted to said radio communication terminal corresponding to said transmission conditions.

24. A method of transmitting program information as defined in claim 22, wherein, in said transmitting step, the program information retrieved in said retrieving step is transmitted to said radio communication terminal, when it reaches a time that is a predetermined time before the start of broadcasting of the program.

25. A method of transmitting program information as defined in any one of claims 22 to 24, wherein said program information reserved in said program information database includes a basic information including the broadcast date-and-time of the program, channel, and program name information and a detailed information concerning the contents of the program, the amount of said detailed information being larger than that of said basic information;

and wherein, in said transmitting step, said basic information of the program retrieved in said retrieving step is voluntarily transmitted to said radio communication terminal, and said detailed information of the program retrieved in said retrieving step is sequentially transmitted to said radio communication terminal when an instruction is provided from said radio communication terminal.

26. A program-recording-instruction-method of instructing a recording operation of a program from a radio communication terminal to a program-recording-apparatus for recording a program to be broadcast, comprising the steps of:

a program-retrieving-step of retrieving a program which satisfies retrieving conditions preset by a user of said radio communication terminal, from a database in which program information concerning a program to be broadcast is reserved;

a program-information-transmitting-step, in which, when a program satisfying said retrieving conditions is retrieved, a program information concerning the retrieved program is obtained from said database, so that the program information is voluntarily transmitted to said radio communication terminal;

a program-information-displaying-step of receiving the transmitted program information at said radio terminal and displaying the received program information, so as to prompt the user to instruct the recording operation of the program; and a recording-instruction-transmitting-step, in which, when the recording operation of the program is instructed, recording-instruction-information is transmitted from said radio communication terminal to said program-recording-apparatus.

27. A method of instructing a program recording operation as defined in claim 26, wherein, in said program-information-transmitting-step, when the transmission conditions which are set corresponding to the user of said radio terminal are satisfied, the program information retrieved in said retrieving step is transmitted.

28. A method of instructing a program recording operation defined in claim 26 or 27, wherein the program information reserved in said database includes a basic information including the broadcast date-and-time of the program, channel, and program name information and a detailed information concerning the contents of the program, the amount of said detailed information being larger than that of said basic information;

and wherein, in said program-information-transmitting-step, said basic information of the program retrieved in said program retrieving step is voluntarily transmitted to said radio communication terminal, and said detailed information of the program retrieved in said retrieving step is sequentially transmitted to said radio communication terminal when an instruction is provided from said radio communication terminal.

29. A program-recording-instruction-method of instructing a purchasing operation of a program from a radio communication terminal to a program-providing-apparatus, said program-providing-apparatus providing a registered user with a program instructed from the user to purchase it, comprising the steps of:

a program-retrieving-step of retrieving a program satisfying the retrieving conditions which are set corresponding to a user of said radio communication terminal from a database in which program information concerning a program to be broadcast is reserved;

a program-information-transmitting-step, in which, when a program satisfying said retrieving conditions is retrieved, a program information concerning the retrieved program is obtained from said database, so that the program information is voluntarily transmitted to said radio communication terminal;

a program-information-displaying-step of receiving the transmitted program information at said radio terminal and displaying the received program information, so as to prompt the user to instruct the purchasing operation of the program; and a purchasing-instruction-transmitting-step, in which, when the purchasing operation of the program is instructed, the purchasing-instruction-information is transmitted from said radio communication terminal to said program-providing-apparatus.

30. A method of instructing a program purchasing operation as defined in claim 29, wherein, in said program-information-transmitting-step, when the transmission conditions which are set corresponding to the user of said radio terminal are satisfied, the program information retrieved in said retrieving step is transmitted.

31. A method of instructing a program purchasing operation as defined in claim 29 or 30, wherein the program information reserved in said database includes a basic information including the broadcast date-and-time of the program channel, and program name information and a detailed information concerning the contents of the program, the amount of said detailed information being larger than that of said basic information;

and wherein, in said program-information-transmitting-step, said basic information of the program retrieved in said retrieving step is voluntarily transmitted to said radio communication terminal, and said detailed information of the program retrieved in said program-retrieving-step is sequentially transmitted to said radio communication terminal when an instruction is provided from said radio communication terminal.

32. An apparatus for wirelessly transmitting program information concerning a program to be broadcast, to a plurality of radio communication terminals, comprising:

- a first memory comprising program information concerning a program to be broadcast;

- a second memory comprising retrieving conditions which are set corresponding to the plurality of radio communication terminals;

- a server which is adapted to access the first memory and the second memory, the server retrieving a program satisfying the retrieving conditions stored in the second memory from the program information stored in the first memory; and

- transmitter for transmitting the program information concerning said retrieved program to said radio communication terminals corresponding to said retrieving conditions.

* * * * *

UNITED STATES PATENT AND TRADEMARK OFFICE
CERTIFICATE OF CORRECTION

| | | |
|---|---|---|
| PATENT NO. | : 7,088,952 B1 | Page 1 of 1 |
| APPLICATION NO. | : 09/830750 | |
| DATED | : August 8, 2006 | |
| INVENTOR(S) | : Hiroji Saito et al. | |

It is certified that error appears in the above-identified patent and that said Letters Patent is hereby corrected as shown below:

On the Title Page

On page 2, in column 1, line 2, under "FOREIGN PATENT DOCUMENTS", delete "858223" and substitute --0858223-- in its place.

On page 2, in column 2, line 2, under "OTHER PUBLICATIONS", after "Personal Computers, Sony" delete "Vajo" and substitute --Vaio-- in its place.

In the Claims

Column 16, in claim 12, line 56, immediately after "communication terminals" delete "-" (hyphen) and substitute --;-- (semicolon) in its place.

Column 18, in claim 19, line 32, delete "date-and-tine" and substitute --date-and-time-- in its place.

Signed and Sealed this

First Day of May, 2007

JON W. DUDAS
*Director of the United States Patent and Trademark Office*